:::::

(12) United States Patent
Rhoades et al.

(10) Patent No.: US 10,432,489 B2
(45) Date of Patent: Oct. 1, 2019

(54) COMPUTING SYSTEM INCLUDING DYNAMIC PERFORMANCE PROFILE ADAPTATION FUNCTIONALITY

(71) Applicant: BlackLine Systems, Inc., Woodland Hills, CA (US)

(72) Inventors: Joshua Rhoades, Winnetka, CA (US); Addam Driver, Woodland Hills, CA (US); Ryan Regalado, Woodland Hills, CA (US)

(73) Assignee: Blackline Systems, Inc., Woodland Hills, CA (US)

( * ) Notice: Subject to any disclaimer, the term of this patent is extended or adjusted under 35 U.S.C. 154(b) by 296 days.

(21) Appl. No.: 15/255,042

(22) Filed: Sep. 1, 2016

(65) Prior Publication Data

US 2017/0070389 A1     Mar. 9, 2017

Related U.S. Application Data

(60) Provisional application No. 62/214,180, filed on Sep. 3, 2015.

(51) Int. Cl.
*H04L 12/26* (2006.01)
*H04L 12/24* (2006.01)
*H04L 29/08* (2006.01)
*H04L 29/06* (2006.01)

(52) U.S. Cl.
CPC ........ *H04L 43/0852* (2013.01); *H04L 41/082* (2013.01); *H04L 41/0823* (2013.01); *H04L 43/0864* (2013.01); *H04L 43/106* (2013.01); *H04L 43/16* (2013.01); *H04L 67/02* (2013.01); *H04L 67/303* (2013.01); *H04L 67/42* (2013.01)

(58) Field of Classification Search
CPC ............... H04L 43/0864; H04L 43/106; H04L 43/0852; H04L 43/16; H04L 51/34; H04L 67/34; H04L 41/0823; H04L 41/082; H04L 67/303; H04L 67/42; H04L 67/02
USPC ........................................................ 709/224
See application file for complete search history.

(56) References Cited

U.S. PATENT DOCUMENTS

| | | | |
|---|---|---|---|
| 6,438,592 B1 | 8/2002 | Killian | |
| 2002/0099818 A1 | 7/2002 | Russell et al. | |
| 2002/0184363 A1 | 12/2002 | Viavant et al. | |
| 2004/0098478 A1* | 5/2004 | Koetke | H04L 43/0852 709/224 |
| 2008/0147846 A1* | 6/2008 | Behroozi | H04L 43/50 709/224 |
| 2011/0055470 A1* | 3/2011 | Portolani | H04L 43/0864 711/108 |

\* cited by examiner

*Primary Examiner* — Kyung H Shin
(74) *Attorney, Agent, or Firm* — Smyrski Law Group, A P.C.

(57) ABSTRACT

A computer networking system including a client device and a server device having a server profiler module and an observer module is provided. The server profiler module maintains a server profile and profiles for at least one client device and the observer module is configured to receive client device performance information from the client device and server device performance information and determine and implement performance parameter alterations based on client device performance information and server device performance information received.

21 Claims, 6 Drawing Sheets

COMPUTING SYSTEM INCLUDING DYNAMIC PERFORMANCE PROFILE ADAPTATION FUNCTIONALITY

This application claims the benefit of U.S. Provisional Patent Application Ser. No. 62/214,180, entitled "Computing System Including Dynamic Performance Profile Adaptation Functionality", inventors Joshua Rhoades, et al., filed Sep. 3, 2015, which is incorporated herein by reference.

BACKGROUND OF THE INVENTION

Field of the Invention

The present invention relates generally to the field of computing systems, and more specifically to computing systems employing dynamic performance improvement techniques.

Description of the Related Art

Current computing systems provide information to users in a generally static fashion, i.e. a data request is transmitted at a fixed size or according to fixed parameters established for expected system operation. Parameters established and employed include but are not limited to data loads, data profiles, performance usage of the CPU (central processing unit) and GPU (graphics processing unit). Such parameters are typically fixed and do not change at all over time. Internet traffic and overall internet performance, including ability to transmit data to and receive data from a remote client, is at least partially dependent on the sizing of these parameters.

System designers typically attempt to gauge usage and set parameters, such as data loads, and establish parameters for system attributes based on anticipated usage, loads, latencies, etc. As a result, parameters are established by designers to suffice in high and low stress situations, but are static in that they are fixed and generally unchangeable—payload size is fixed, for example, with the expectation of an overall system load, the user's device attributes (a fastest, most modern machine and a 10 year old device may be contemplated, and the system parameters are calculated and established to hopefully address both). In certain limited circumstances, parameters may be changed, but changes are system wide and are typically infrequent.

Further, in the internet traffic realm, applications related to website deployment, such as APIs (application programming interfaces) are called under identical circumstances and perform in the same way irrespective of system load or user device or network limitations.

Such a one-size-fits-all approach does not address the myriad situations faced by a website application system, wherein different user devices are employed, having different capacities and capabilities, such as CPU or GPU processing limitations and specifications, using a medium such as a wired or wireless connection having certain unknown or unanticipated benefits or limitations. As a result, network performance is not optimized, website transmissions can be and in most cases are sub-optimal, and user experience and system wide performance can be hindered as a result.

It would therefore be advantageous to provide a system that overcomes established, static limitations employed in former systems and enables altering of system related parameters depending on circumstances encountered.

SUMMARY OF THE INVENTION

Thus according to one aspect of the present design, there is provided a computer networking system comprising a client device comprising a manager and a client profiler module, wherein the manager manages a profile for the client device as determined by the client profiler module, and a server device comprising a server profiler module and an observer module, wherein the server profiler module maintains a server profile and profiles for at least one client device and the observer module is configured to receive client device performance information from the client device and server device performance information and determine and implement performance parameter alterations based on client device performance information and server device performance information received.

According to another aspect of the present design, there is provided a server device comprising a server profiler module configured to maintains a server profile and profiles for at least one client device and an observer module configured to receive client device performance information from a client device and server device performance information and determine and implement performance parameter alterations based on client device performance information and server device performance information received.

According to a further aspect of the present design, there is provided a computer networking system comprising a client device and a server device comprising a server profiler module and an observer module, wherein the server profiler module maintains a server profile and profiles for at least one client device and the observer module is configured to receive client device performance information from the client device and server device performance information and determine and implement performance parameter alterations based on client device performance information and server device performance information received.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present design is directed to a website application system configured to conduct internet traffic while tailoring loads and/or profiles and performance usage by the CPU and GPU of the user's device. The system tracks the performance of rendering, network transmission and reception performance, and actions over time for each user. The system monitors actions and the timing events of or associated with such actions, such as transmission times, return times, and so forth. The system may also beneficially employ APIs (application programming interfaces) depending on conditions, such as leveraging browser APIs that provide or otherwise enable additional beneficial functionality.

Improved system performance is achieved in two general ways: reactive, wherein the system operates to trigger monitoring start and stop points to determine performance of various parameters at desired times, to create trigger profiles, to categorize or to update based on recent data interactions and performance over a given time period. Second, the system improves performance using prediction, using event-driven device architecture preferably including an input/output API that does not block incoming or outgoing traffic, such as NodeJS. Such predictive operation may track events and dispatch profile information directly to user-facing code.

Figure 1:
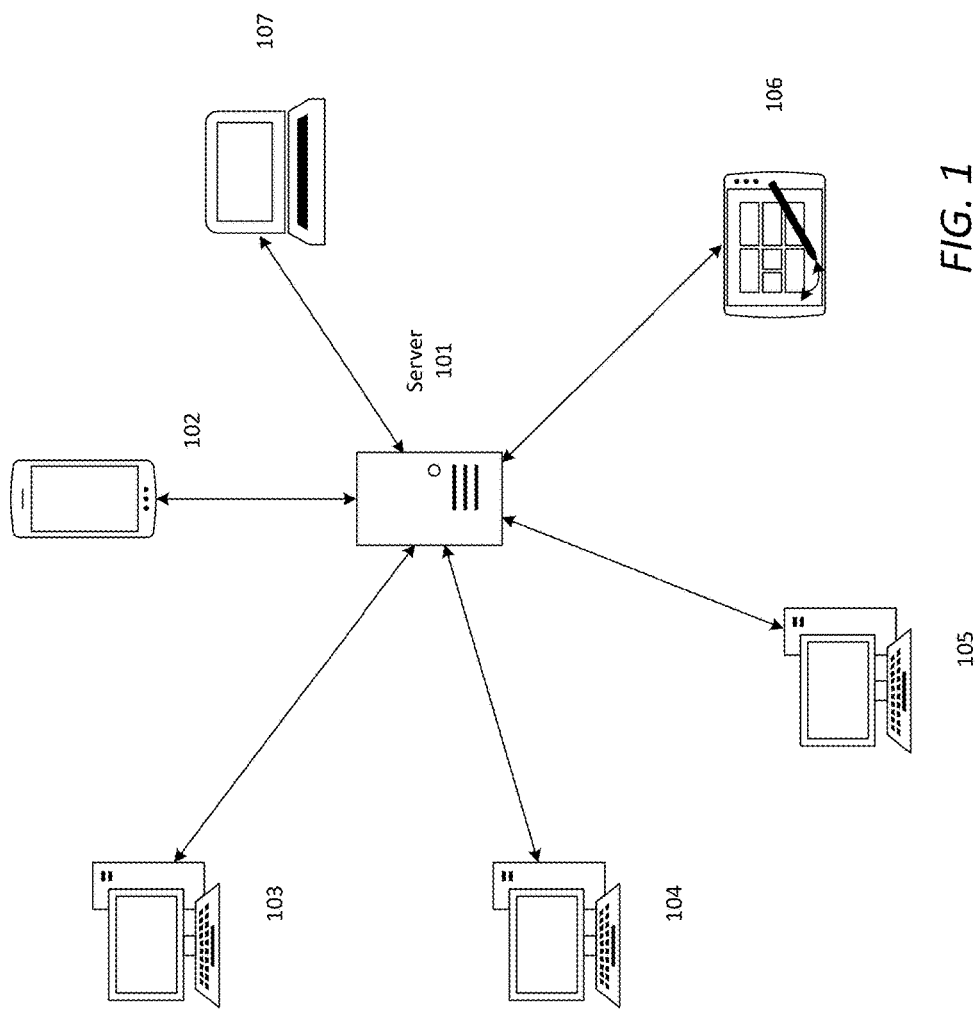
FIG. 1 is a general representation of a network.

FIG. 1 illustrates a general network design including server device 101 and various client devices 102-107. Any number of client deices may be employed, and more than one server device may be employed, but in general many user devices are able to connect with and receive data from a single server device. Each client device may have a particular and possibly unique set of attributes and components, including but not limited to CPU, GPU, browser, network interface, user interface, and so forth.

Reactive/Predictive Functionality

Figure 2:
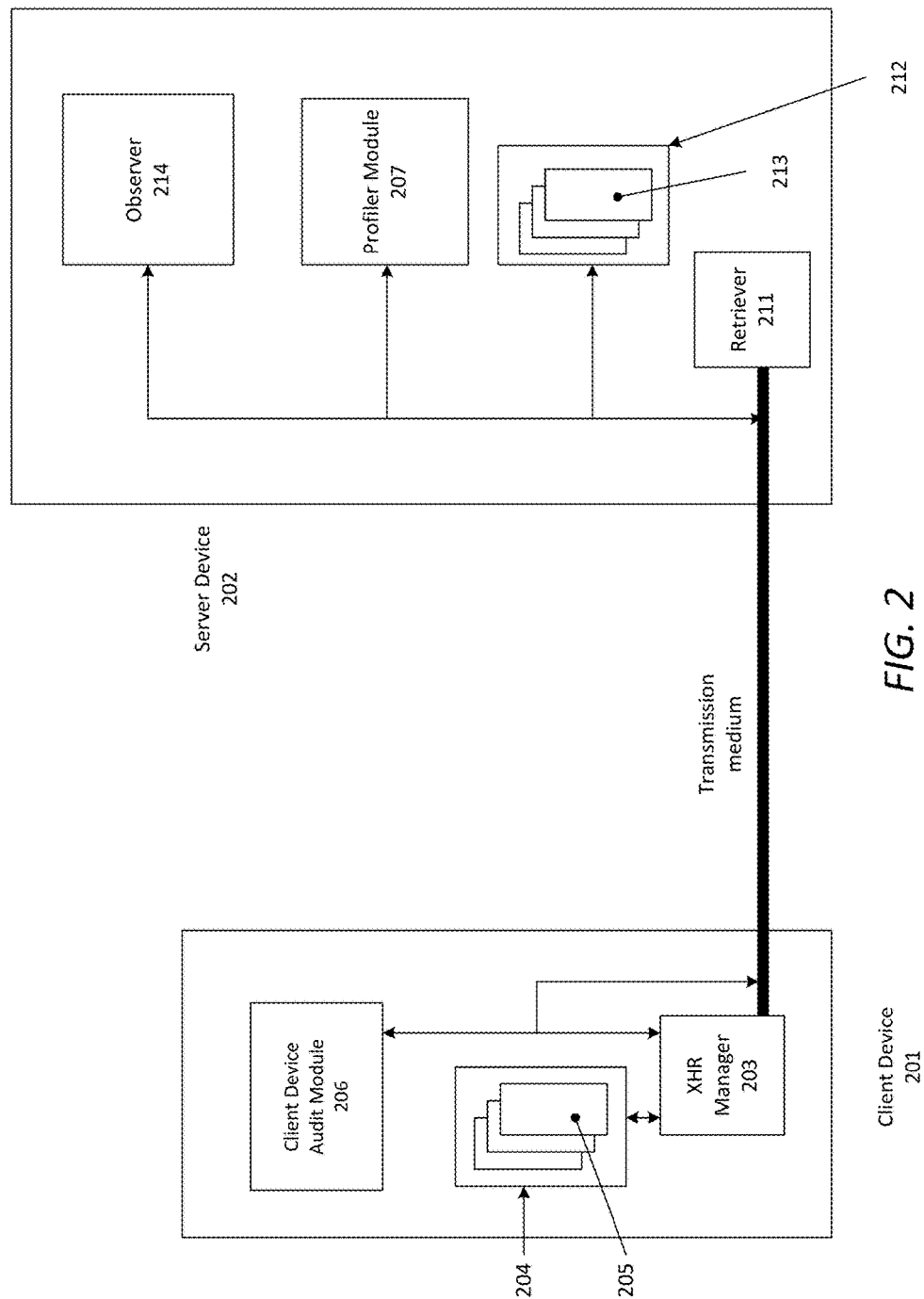
FIG. 2 illustrates the server device-client device relationship and components of the devices in accordance with the present design.
Figure 3:
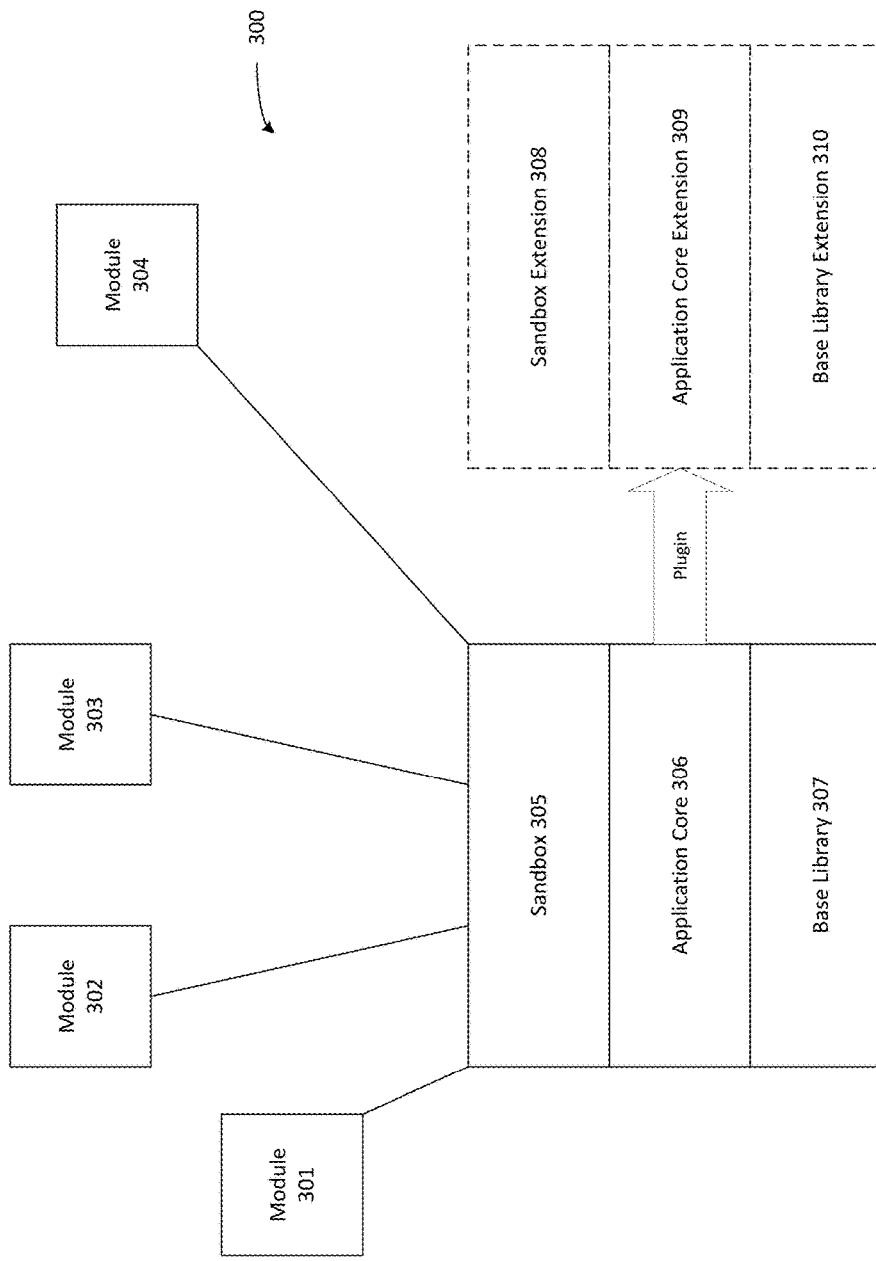
FIG. 3 illustrates a conceptual overview of modules and architecture components in accordance with one embodiment of the present design.

FIG. 2 is one representative embodiment of an architecture in accordance with the present design. From FIG. 2, client device 201 and server device 202 are provided. While not shown in this view, any number of client devices may be available. In the client device 201, XHR calls are received and are routed through a central XHR manager 203. An XML Request (XHR) is an API used to send, for example, HTTP (or HTTPS) requests to servers such as server device 202 and load server response into the script for subsequent use, and an XHR call is a call for an XML Request. Other functionality may be supported, including but not limited to leveraging sockets (e.g. WebSockets, which provide full-duplex communication channels over one TCP connection) and real time client/server communication, wherein the server pushes information to the client rather than the client being required to poll the server for information. The XHR manager 203 operates to consult with a database 204 in the client device 201 to see if a performance profile exists for the client device. Performance profile 205 exists for this client device and is retrieved by the XHR manager 203 and employed. The performance profile may include information as discussed herein, including but not limited to performance during a particular period, such as load, query, interaction, etc., and represents the user's network and machine abilities.

The system determines the timing and performance of the client device using XHR manager 203, and usage of XHR within XHR manager 203 on the client device 201 may be updated to provide additional meta information to aid in categorization profiling. Audit module 206 provides auditing of the XHR traffic, specifically identifying performance of certain functions or under certain conditions when, for example, data is unavailable, or conditions have changed such that new measurements may be beneficial, and so forth. Client device audit module 206 sends its results to profiler module 207 on server device 202, wherein auditing determines both the information present and possibly information missing and is used to augment the client device profile. If certain information is missing, the audit module may obtain such information and may send such information to the profiler module 207. Missing information may also be identified by the audit module and the absence of such information may be provided to the profiler module 207. Thus both the XHR manager 203 and the client device audit module 206 may provide performance information for the client device 201 to the profiler module 207 in the server device 202.

Profiler module 207 averages performance and performs calculations necessary to determine a category of the client device's capabilities for both network and machine performance. The profiler module 207 creates the performance profile 205 for the client device based on observed XHR traffic and information received from the client device and may store the performance profile 205 in/with the user's browser on the client device for reference and re-use. Monitoring in this manner comprises monitoring of various performance metrics, including but not limited to metrics such as response time, response time combined with response or request size, and hardware concurrency (amount of processing power employed). In certain browsers, i.e. on certain client devices, additional details of speed and latency performance may be available on the client device. Certain client devices may employ browsers that include and support a Navigation Timing API, also known as Network Performance, that provides information such as response start time, response end time, domain lookup start time, domain lookup end time, and so forth. Additionally, DNS lookup times may be considered when available, and such times can vary once the DNS lookup function is cached by the browser. Such measurements can serve to enable differentiation between fetching of data and loading of the page into loading, interactive, and complete states, and enables measurement of response time versus request time, and so forth.

The ability to discern the time required to perform certain tasks or functions at the client device can be very powerful in determining the requisite or suggested parameter alteration that can improve performance. For example, if the client device can determine that certain operation over an N second period calls for extensive CPU processing but the received XHR traffic is relatively low, XHR traffic may be throttled down and only transmitted intermittently at a lower rate than previously employed. Similarly, if the CPU at the client device is determined by the client device to be running at a low rate while network traffic is very high, the server may receive such information and may transmit smaller packets of data at a rate sufficient to pass efficiently through the network and provide enough data such that the CPU can efficiently process the information received. Different settings, parameters, and functionality can be provided, but the client device and the server device measure a triggering of a request for data, such as to an API, and when the server receives the response back. From this, packet size, transmission rate, and other relevant parameters may be adjusted or altered.

At the server device 202, retriever 211 may make a call to the local database 212 for a performance profile 213 for the user. If such a performance profile 213 exists, which may be different than the performance profile 205 available in client device 201, the performance profile 213 may be transmitted to the client device 201. The profiler module 207 may make a comparison of performance profile 205 and performance profile 213 and optimize performance profile 205, such by adding or deleting or modifying performance values (speed of transmission, packet size, packet contents, etc.). The observer 214 observes all API queries made at the server device 202. The observer 214 audits traffic much like the audit module 206, wherein auditing determines content of the performance profile(s) based on conditions existing, and the observer 214 also averages performance and performs calculations necessary to determine capabilities for both network and machine performance, including network, client device, and server device performance observed at the server device 202. Server device information may be collected, updated, and broadcast to client devices, including new profile data transmitted to one or more client devices for use. All other observers at the server level use this server information to tune performance of key actions as needed, desired, or configured.

In one embodiment, a user may be categorized based on all available information in the profile or all information observed regarding interactions between the server device and the client device. Effectively categorization may operate as a decision tree that accounts for speed and processing power as well as responses over time to determine a category of user and adjust attributes or performance based on the user's category. In one example, a user may be considered a maximum level user and may have API payload size increased by a value of X. Logarithmic scales may be employed to determine increases and/or decreases in increments smaller than X. Hysteresis functionality may be employed to avoid frequent changes resulting from constantly updated conditions, and/or recategorization of the user. Changes are primarily related to data payload sizes, such as increasing the payload size to transmit more data. If the server device has information regarding the total payload size accepted by the client, the server may load the entire payload at once to make interaction speed faster. Such a command or function could in turn be used to pre-fetch paginated records based on known context of the context or situation, e.g. grid N has rendered page 2 of 10 with 100 records per page, and thus the records could be pre-fetched and transmitted in a maximum size payload. Features such as transition effects, animations, slide/flow/resize, and so forth could be used to enabled or disabled to tune to the client device processor's abilities if such parameters are available to the server device.

Other areas where performance may be monitored and altered may include modifying Single Page Application rendering, swapping between client device and server device to render static assets or dynamic assets, and switching between light versions of an application, such as stripped down in functionality, versus full versions of an application. Depending on circumstances, these and other functions may be altered depending on system loads and performance encountered.

Performance conditions are constantly monitored by the client device. Not all client device performance values are useful or necessary. For example, how long a specific module takes to render may not be relevant or useful for tuning, while length of time required for an API to respond with J records can be useful in establishing performance criteria and functionality. In general, all XHR/API requests are assessed and are actionable.

The server device may be constant for specific areas, such as data requests (XHR/API), storing state, i.e. recalling what the user had done with or to a page such that when the user goes back to the page it is represented in the last state the user had encountered, and relevant communications, such as logging and/or data requests. In sum, one embodiment of the current design constantly monitors client device performance and constantly monitors certain aspects of server side performance and alters functionality based on the characteristic encountered. The system monitors all function initiations and timing thereof, and some may be unavailable to the server device for performance improvement.

The system builds out data grids, wherein grids are created, interact, and are destroyed on one layer, with service calls provided to a separate layer. The system thus can be considered to include two core components, the core and the grid. The core component is a main engine that builds, transforms and manipulates the grid. The core contains items such as DOM traversal (finding elements, such as HTML elements, based on their relationship to other elements), and a CSS engine to control styling and helpers to check and manipulate objects. The core represents a low level or behind the scenes architecture supporting the data grids.

The data grid is the main presentation layer and handles rendering of the data grid and establishes user interaction methodology. The grid includes, for example, the grid schema establishes the manner by which options are received, construction of HTML, and appearance of the data. Data sharing between users on the grid and multicell selection and other actions are provided on the grid, where the grid can be considered a high level layer representing what the user sees and how the user can interact with the grid and the core.

FIG. 2 presents an overall architecture 300 for the system. Various modules 301-304 interface with sandbox 305, and application core 306 and base library 307 are also provided. Modules also interface with extensions, namely the extension of the sandbox 308, which interfaces with the extension of the core 309 and the extension of the base library 310. Extensions 308-310 can be created via plugin. Each component in the architecture only interfaces with adjacent components, and thus modules cannot access the application core 306 directly, but must communicate or gain access via sandbox 305.

A module, such as one of modules 301-304, is one component of a web application and includes UI components that perform a particular function. For example, a header module houses navigation elements, a reconciliations module addresses account reconciliations, and a dashboard module reports using graphics charts. The sandbox 305 is an interface for modules to communicate with other modules. The application core 306 controls the registration, creation, and destruction of modules, provides for module communication, and provides for plugin extensions. A plugin extends the application core 306. Plugins in this context manage and use third party libraries to extend the capabilities of the system. Examples include grid plugins that provide the ability to create grids, UI components that add more user interface components, dependency manager plugins that can extend how assets are managed or loaded, and form validation plugins that can extend how form input elements are checked and how errors are displayed.

The base library 307 is accessible by the application core 306. The base library 307 may provide general purpose utilities, such as object and DOM manipulation utilities, templates, and so forth.

Figure 4:
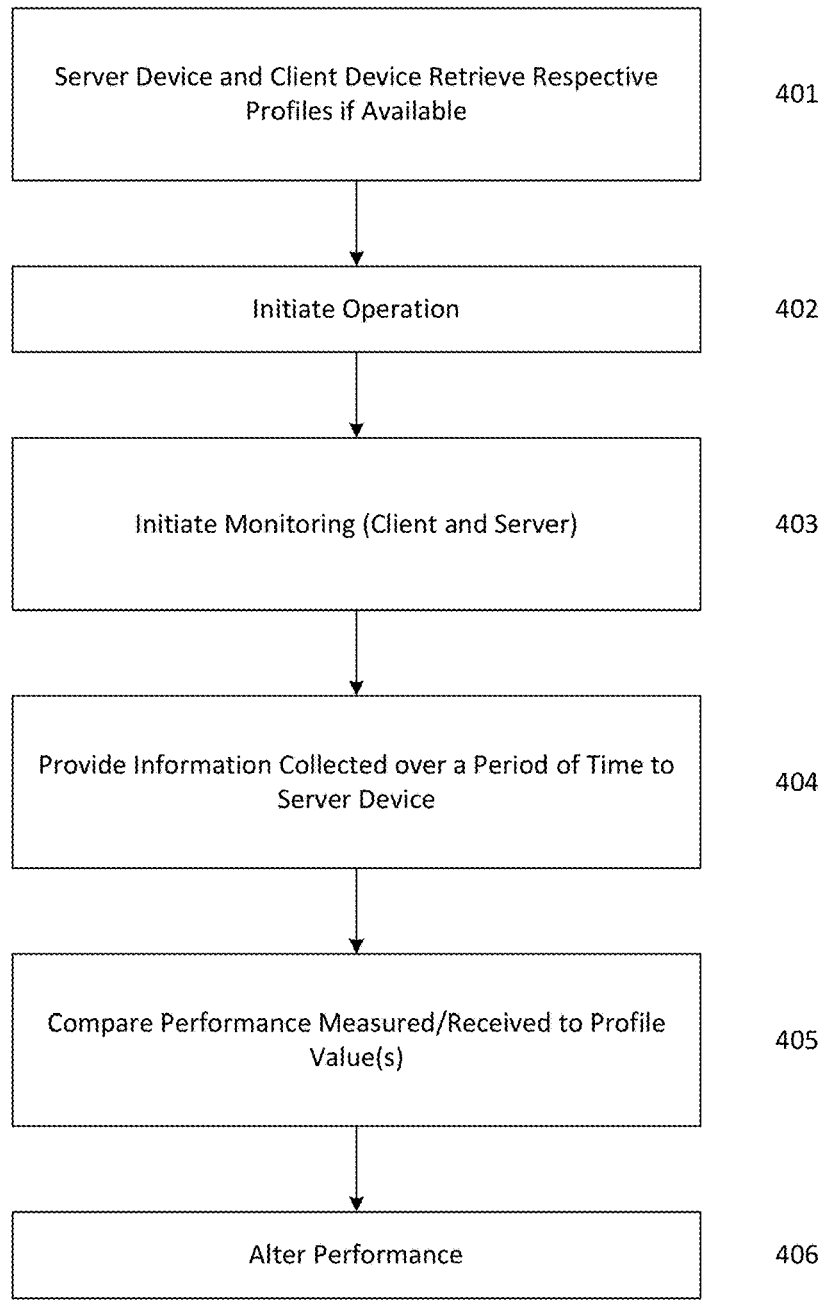
FIG. 4 is a flowchart representing general operation of the system.

In operation, the system monitors both operation at the client device and operation at the server device. FIG. 4 is a general flowchart of operation. At point 401, the system causes both the server device and the client device to retrieve respective profiles, if available. At point 402, operation is initiated, and operation may occur based on the profiles associated with the client device and/or server device depending on profiles. At point 403, monitoring is initiated, wherein monitoring occurs on the client device, typically constantly, and the server device monitors in the manner disclosed herein. At point 404, information over a desired time period is provided to the server device, and in particular to observer 214 at the server device, that can compare at point 405 the performance measured and received to any measured profile value or values. At point 406, based on the comparison made at point 405, the system may alter performance to improve performance between server device and client device, wherein performance improvement may comprise altering packet size, packet contents, speed of transmission of packets, or other metrics associated with the system.

Figure 5A:
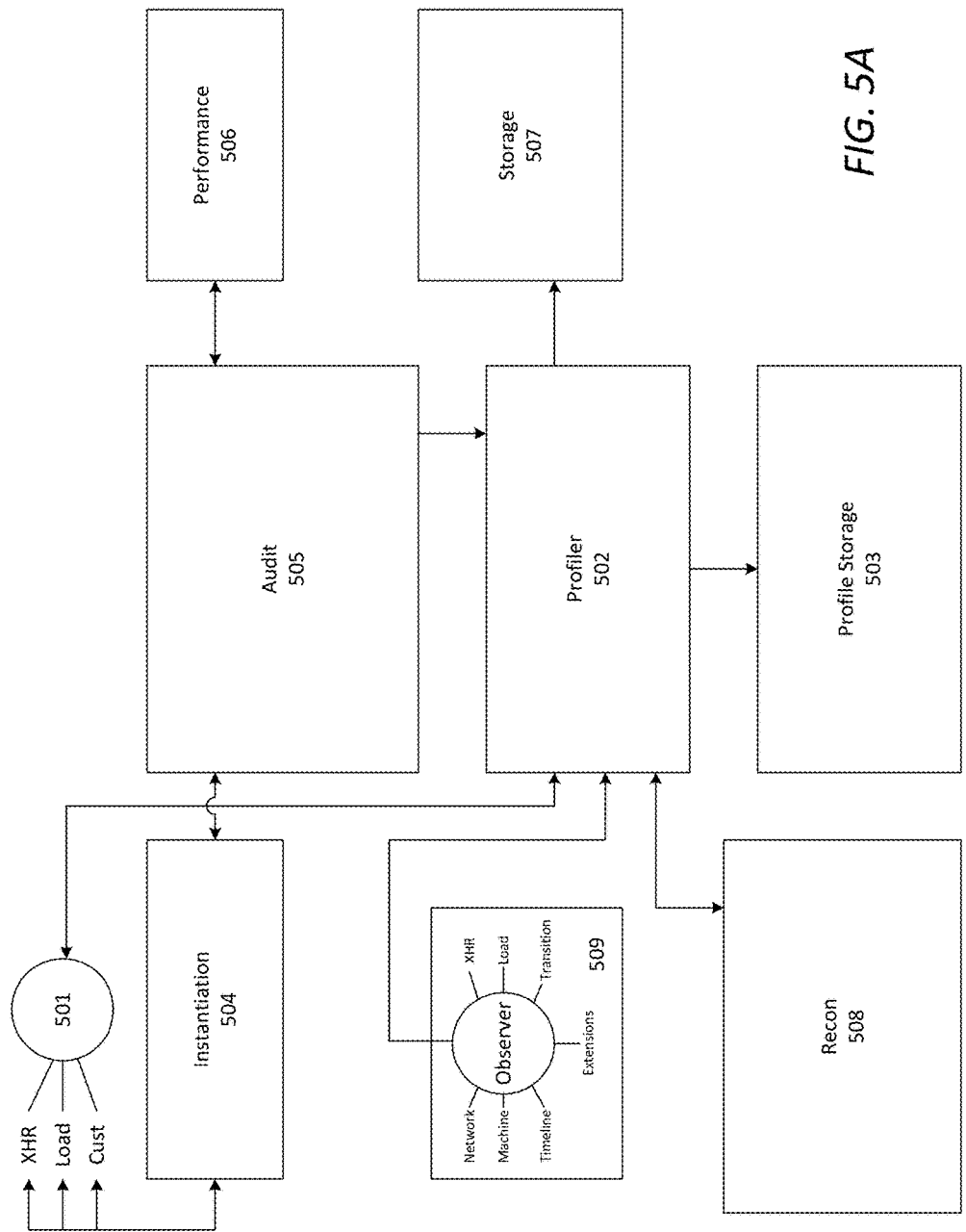
FIG. 5A illustrates an alternate embodiment of the present design.

FIG. 5A represents an alternate overview of the system and the performance profile adaptation of the present design. From FIG. 5A, an identity module 501 receives information about a component in the system, including XHR, load, or custom information and establishes an identity for the component. From this, a profiler 502 creates a profile of the component, which may be a client device or the server device, and may collect data over time for the identity of the component, including but not limited to information such as the connection, type of connection, average connection time, last connection time, performance of a particular function, date and time of the function, minimum time and/or maximum time for performing the function, peak and limit times, averages and histories, and the data collected may be sorted by maximum, minimum, average, performance over time, or by type. For a client device, the profile includes inbound reactive instances, i.e. instances received wherein the client device is required to react to the instance, rather than mere collection, for example. For a server device, profiler 502 collects automatically broadcast information and determines return performance, i.e. performance from one or more client devices. Profiles thus established are stored in profile storage component 503 and may be retrieved as necessary. Profiles are stored locally, and thus profile storage component may be considered to exist at a client device or a server device. In general, all profiles stored include or represent interactions between the server and at least one client device, and any server profile created can be provided to other servers as necessary. If client device for another server can be useful, the client device profile may also be provided to the other server.

Public instantiation module 504 establishes instances of requests by devices outside the server, including initiating an audit, obtaining records, establishing a profile, updating a profile, querying a profile, and so forth. The public instantiation module 504 may interface with audit module 505 to audit the profiles obtained, where an audit can be used to verify or evaluate the contents of a profile or to initiate and evaluate a desired function, such as beginning an audit, measuring performance (client device or server device) for a period of time and ending the audit to determine time required to perform a function. For example, an audit of client API W performance may be initiated, such as by a source outside the server, and client API W may be monitored for 15 seconds, during which time a client device may have commenced API W and completed API W in 9.34 milliseconds. This information may be provided to performance module 506 and back to public instantiation module 504 as required, where performance module 506 may be consulted by the audit module as to which test to perform, what is being evaluated, for how long, and other relevant parameters. Session storage and local storage may be addressed using storage module 507, wherein storage module 507 gets, sets, removes and/or purges, and otherwise maintains records used by or in profiler 502.

Recon module 508 evaluates reconnections, i.e. when a new client device is encountered recon module 508 determines whether that client device has been previously encountered and if so what performance can be expected, the type of device, the network employed in connecting to the server device, and so forth. This information is obtained from profiler 502 and may be updated and provided back to profiler 502 and stored in profile storage module 503. Various means for identifying client devices may be used, such as DNS number, device ID, and/or even past performance characteristics.

Observer 509 observes performance over time in a non-audit situation, again constantly at the client device and as described herein at the server device. As shown, performance observed includes network performance, machine performance, timeline, XHR, load, transition, and extension performance, and this information is provided, such as via a pubsub (publish and subscribe) arrangement, to profiler 502 to enhance the profile for successful alteration. Profile reactions thus occur in profiler 502 and system performance may be altered as a result of the performance observed. The observer 509 is thus system triggered and not initiated by the user and observes performance at both the client device and separately at the user device.

Figure 5B:
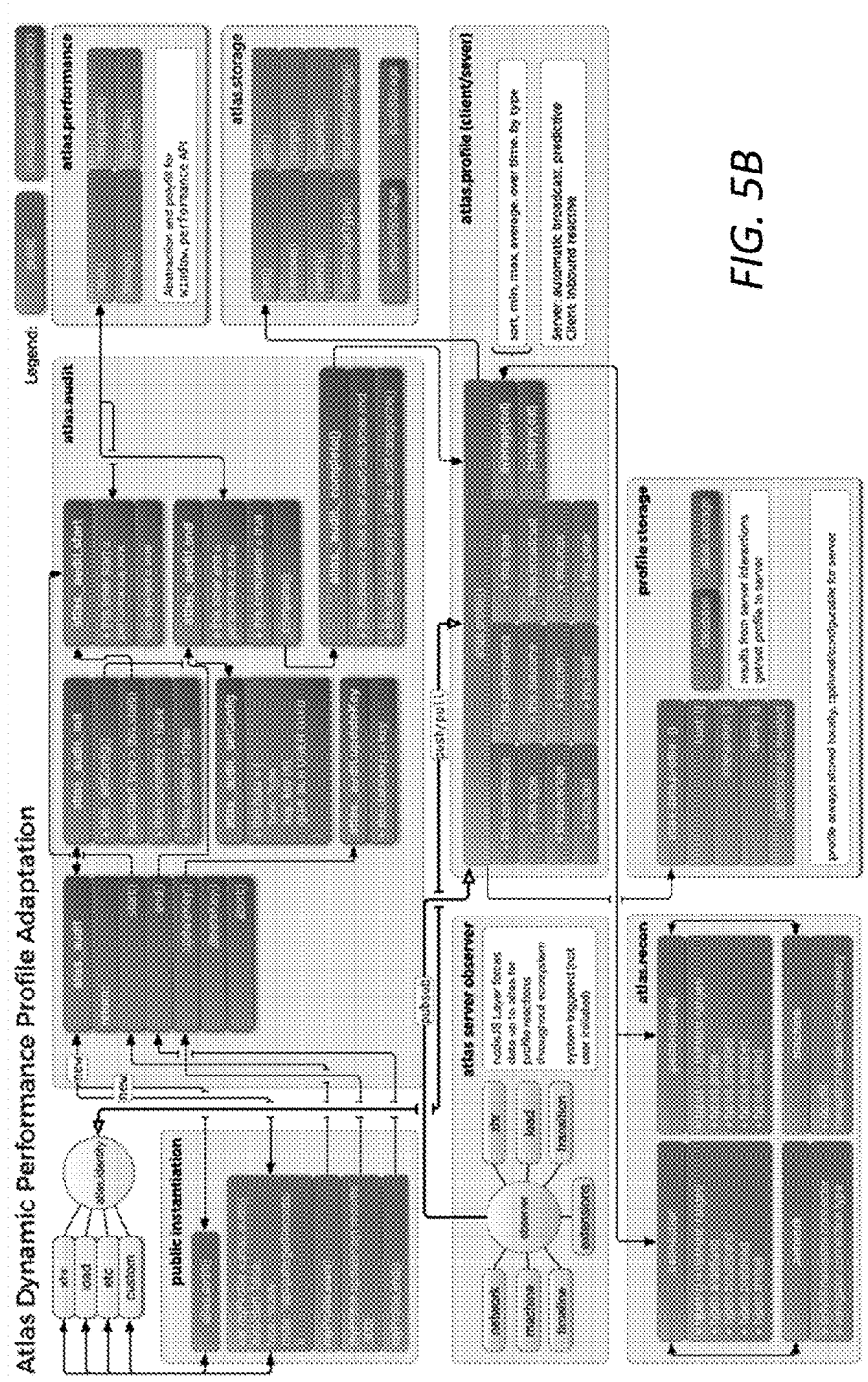
FIG. 5B is an alternate representation of the depiction of FIG. 5A.

FIG. 5B is an alternate representation of the depiction of FIG. 5A.

Performance may be altered in different ways depending on circumstances. For example, in the present design the system may determine a load profile, with performance altered for light versus full modes, i.e. loading heavy assets as opposed to loading downgraded lighter assets. Animation effects may be disabled in certain circumstances (transitions, reactions, sliding/fading, movement on the screen, and so forth), and providing additional Web Workers, where Web Workers are JavaScript methods running in independent processing threads, independent of other scripts and processes, in the background of ongoing processing such that performance of the page is not impacted. Additional Web Workers, or additional processing threads, may be provided on the server (NodeJS) instead of the client if the client is taxed or of low quality. Performance may further be altered by switching between client device and server device processing based on capabilities. For example, if the client displays high powered processing capacities, data can be front-loaded to the client device instead of querying the database for filtering or sorting. Performance can also be altered by disabling or pausing processor-intensive actions based on higher-priority actions. In this situation, if the client is low performing or taxed and in the midst of an intensive action (sorting, filtering, intense calculations, etc) and then requests new data, the system may pause those actions and load the data, and subsequently may resume the actions on the old and new data as a whole. Alternately, the system may prioritize actions, wherein in a taxed system ordering of operations may be based on performance.

Additionally, the system may alter performance by altering responsive messaging. On data requests that take a relatively long time, the system can provide a dynamic message, based on the categorization of the user, indicating a function or process is taking longer than expected. More specifically, the system can block or warn on possible destructive actions, as the system recognizes that some data manipulation is in process, has not completed (is either still processing or waiting for a response from the server). If the user seeks to take an action that would affect performance in process, the system could warn and inhibit or stop the action. Alternately, the system may capture the user action and preserve that state, reintroducing the availability of the action and enabling the user to commence or resume the aborted action. The system may alternately provide a mechanism that allows a user override such an action categorization within his or her profile, or the user may choose to limit himself or herself. Such a setting may be similar to a setting on a smartphone that stops video downloads unless the phone is tuned to a WiFi connection. The system may also track data and/or user requests system wide, not just per user. Such a system may provide a representation of all clients currently using the system, their sizes of payload capabilities, as well as potentially combined server(s) and network I/O information to present options to the user, such as messaging that the system is under heavy load and delays could be expected.

Each of these performance capabilities may be combined with device specific rules and controls, applicable to personal computers, tablets, mobile devices, etc. The system may further consider whether the individual device is connected to the network via WiFi or LTE/Edge or in some other manner. In one aspect, if the client visits from a mobile device the system may decrease all payload sizes by some percentage, or turn off specific client-based processing actions, or augment the rules of categorization with device-specific profile rules, or take other actions.

Further, the system may increase or decrease request and response data payload sizes, prefetching or preloading data when the system encounters lulls in request/response activity and preload data where appropriate, such as by prefetching the next n pages of records in a paged view, loading all data for a request (in a paginated data model) if the user is capable of loading the data for the request and the total data size to be loaded is within the capability of the user device.

Configurability and Customization

The current design is also highly configurable and can be customized to a previously unknown level. Virtually all frameworks rely on exposure of specific paths of action to perform a function, such as an API to handle parsing data, the fact that a form was submitted, or a field was updated. For components the framework creates and exposes (such as a Dropdown Menu, or a Data Grid, or a Module), the system must manually and physically expose some manner of API to allow a developer to control and manipulate that method, or the system must bind to Events written into the code to trigger on certain actions (typically via DOM Level2 Native Events). The present design does not require such API exposure. The present design instead exposes all actions and events that are occurring with anything occurring within the system. The system does not need to create or employ specific APIs do not need to be created. Instead, any of the native events occurring within the system can be bound to, and functionality may be triggered from the binding to the native event(s). The system exposes physical APIs that do specific tasks as helpers. However, all events broadcast inject this capability into all methods within the system, thereby ensuring all methods within the system do this in the same way every time and each method does not have to maintain this capability.

The system further extends native browser/DOM Level2 events by offering a custom event model that goes beyond native events like a user performing a Click action, a MouseOut versus MouseOver, Focus, Blur, Change, PropertyChange, and so forth. The present design augments the event model with events specific to the entire system, such as a Component (like a data grid) loading, or scrolling, or requesting new data, or reaching the end of the data, or various other things. In other frameworks, if one wanted to trigger a custom function or action if a user reached the end of the dataset for a grid, such functionality would either have to be built into the framework by default and exposed as an API (callback), or the developer would have to bind to any scroll event (native DOM Level2 event) of that grid and then parse that grid's data or exposed APIs to determine the last record, then check the source data to see the total record count, and if those two matched, then finally execute the custom function. In the present system, the system initiates a custom event when the end of the data is reached. The custom event can be used in any manner desired to do whatever is desired, without having to manually create this custom event within the system each time the custom event is to be exposed for use. Instead the current system event model combines both DOM Level2 events and custom events, and the system forces all methods to expose those configured custom/native events without further intervention or processing.

Further, such events can be "chained" together as a result of namespacing inheritance in the custom event model and hierarchical events. For example, one can bind to all "system.ui.grid" events, and everything a grid does can be acted on. Alternately, one can bind to "system.ui.grid.refresh" events. Chaining indicates one can trigger custom functionality on specific sequences of events or actions a user has taken. If the user refreshes the grid, and triggers a page scroll, then jumps to page K of the possible results, that chain of events can be captured and a custom function can be initiated based on this, such as "We noticed you might be having difficulty finding your data. You can search this data grid directly as follows: . . . " These events, including their chaining abilities, is part of the system. Such functionality does not need to be exposed, or additionally included, nor maintained, it is provided by manipulating the prototype via prototypical inheritance to ensure that every method and feature of the system inherits and uses this event model.

In the present design, an event model is provided that when initiated enters a browser and removes the entire native JavaScript DOM Level2 event modal (clones its prototype), then standardizes and normalizes the prototype, and provides custom system events as additions, and then reinserts that altered functionality into the browser as a replacement to the event model. This provides a consistent event model across browsers, reducing or eliminating the need for browser sniffing or feature detection, enabling control of the entire event model when system code is running such that the system event model is available system-wide.

In combination with the event model loaded into the browser, the custom system events are direct maps to system capabilities. With native DOM Level2 events, "load" events, such as lading of an item or page, can be bound to. But that binding, due to loading of the custom system events into the browser, allows the specific "load" event to be system specific: a grid loading, new data loading, a new module being loaded into view, and so forth, are all specific to the system. Events are chained as described.

Events are defined that are desired to be exposed by the system. Exposing the system events as events that initiate without further input are beneficial. This reduces or eliminates the need to alter functions to indicate a particular function should initiate Events D, E, and F, and reduces or eliminates the need to indicate the initiation of Events D, E, and F every time it should occur. System events are defined in advance for the system to expose and as a result, the event model is available for every method in the system.

Thus according to one embodiment of the present design, there is provided a computer networking system comprising a client device comprising a manager and a client profiler module, wherein the manager manages a profile for the client device as determined by the client profiler module, and a server device comprising a server profiler module and an observer module, wherein the server profiler module maintains a server profile and profiles for at least one client device and the observer module is configured to receive client device performance information from the client device and server device performance information and determine and implement performance parameter alterations based on client device performance information and server device performance information received.

According to another embodiment of the present design, there is provided a server device comprising a server profiler module configured to maintains a server profile and profiles for at least one client device and an observer module configured to receive client device performance information from a client device and server device performance information and determine and implement performance parameter alterations based on client device performance information and server device performance information received.

According to a further embodiment of the present design, there is provided a computer networking system comprising a client device and a server device comprising a server profiler module and an observer module, wherein the server profiler module maintains a server profile and profiles for at least one client device and the observer module is configured to receive client device performance information from the client device and server device performance information and determine and implement performance parameter alterations based on client device performance information and server device performance information received.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A computer networking system, comprising:
a client hardware device comprising a manager and a client profiler module, wherein the manager manages a profile for the client hardware device as determined by the client profiler module; and
a server hardware device comprising a server profiler module and an observer module, wherein the server profiler module maintains a server profile and profiles for at least one client hardware device and the observer module is configured to receive client hardware device performance information from the client hardware device and server hardware device performance information and determine and implement performance parameter alterations based on client hardware device performance information and server hardware device performance information received;
wherein performance parameter alterations implemented comprise one from the group consisting of altered packet size, altered packet contents, altered application functionality, and altered packet transmission speed;
wherein the client hardware device performance information comprises a set of times required for the client hardware device to perform a corresponding set of known tasks over a further corresponding set of known time periods, and a performance profile comparison of the client hardware device performing one known task over one known time period results in the at least one of the server hardware device and the client hardware device implementing one performance parameter alteration.

2. The computer networking system of claim 1, wherein the client hardware device further comprises a client auditing module configured to determine specific performance functionality of at least one application running on the client hardware device.

3. The computer networking system of claim 2, wherein the server hardware device further comprises a server auditing module configured to determine specific performance functionality of at least one application running on the server hardware device.

4. The computer networking system of claim 1, wherein the observer module is configured to alter system functionality when variances in client hardware device performance or server hardware device performance are detected.

5. The computer networking system of claim 1, wherein the server profiler module is configured to alter at least one server attribute in a server profile maintained on the server hardware device, wherein the at least one server attribute comprises server hardware device performance of a server hardware device function over a first period of time.

6. The computer networking system of claim 5, wherein the client profiler module is configured to alter at least one client attribute in a client profile maintained on the client hardware device, wherein the at least one client attribute comprises client hardware device performance of a client hardware device function over a second period of time.

7. The computer networking system of claim 1, wherein the server hardware device is configured to provide an event model that when initiated enters a client hardware device browser, removes an event modal and clones a prototype of the event modal, standardizes and normalizes the prototype, provides custom system events as additions to provide altered functionality, and reinserts that altered functionality into the browser.

8. A server hardware device comprising:
   a server profiler module configured to maintains a server profile and profiles for at least one client hardware device; and
   an observer module configured to receive client hardware device performance information from a client hardware device and server hardware device performance information and determine and implement performance parameter alterations based on client hardware device performance information and server hardware device performance information received;
   wherein performance parameter alterations implemented comprise one from the group consisting of altered packet size, altered packet contents, altered application functionality, and altered packet transmission speed;
   wherein the client hardware device performance information comprises a set of times required for the client hardware device to perform a corresponding set of known tasks over a further corresponding set of known time periods, and a performance profile comparison of the client hardware device performing one known task over one known time period results in the at least one of the server hardware device and the client hardware device implementing one performance parameter alteration.

9. The server hardware device of claim 8, wherein the server hardware device is configured to receive information from the client hardware device comprising:
   a manager;
   a client profiler module; and
   a client auditing module, wherein the manager manages a profile for the client hardware device as determined by the profiler module, and the client auditing module is configured to determine specific performance functionality of at least one application running on the client hardware device.

10. The server hardware device of claim 9, wherein the server device further comprises a server auditing module configured to determine specific performance functionality of at least one application running on the server hardware device.

11. The server hardware device of claim 9, wherein the client profiler module is configured to alter at least one client attribute in a client profile maintained on the client hardware device, wherein the at least one client attribute comprises client hardware device performance of a client hardware device function over a second period of time.

12. The server hardware device of claim 8, wherein the observer module is configured to alter system functionality when variances in client device performance or server device performance are detected.

13. The server hardware device of claim 8, wherein the server profiler module is configured to alter at least one server attribute in a server profile maintained on the server hardware device, wherein the at least one server attribute comprises server hardware device performance of a server hardware device function over a first period of time.

14. The server hardware device of claim 8, wherein the server hardware device is configured to provide an event model that when initiated enters a client device browser, removes an event modal and clones a prototype of the event modal, standardizes and normalizes the prototype, provides custom system events as additions to provide altered functionality, and reinserts that altered functionality into the browser.

15. A computer networking system, comprising:
   a client hardware device; and
   a server hardware device comprising:
      a server profiler module; and
      an observer module,
   wherein the server profiler module maintains a server profile and profiles for at least one client hardware device and the observer module is configured to receive client hardware device performance information from the client hardware device and server hardware device performance information and determine and implement performance parameter alterations based on client hardware device performance information and server hardware device performance information received;
   wherein performance parameter alterations implemented comprise one from the group consisting of altered packet size, altered packet contents, altered application functionality, and altered packet transmission speed;
   wherein the client hardware device performance information comprises a set of times required for the client hardware device to perform a corresponding set of known tasks over a further corresponding set of known time periods, and a performance profile comparison of the client hardware device performing one known task over one known time period results in the at least one of the server hardware device and the client hardware device implementing one performance parameter alteration.

16. The computer networking system of claim 15, wherein the client hardware device comprises a manager and a client profiler module, wherein the manager manages a profile for the client hardware device as determined by the client profiler module, and the client hardware device further comprises a client auditing module configured to determine specific performance functionality of at least one application running on the client hardware device.

17. The computer networking system of claim 16, wherein the server hardware device further comprises a server auditing module configured to determine specific performance functionality of at least one application running on the server hardware device.

18. The computer networking system of claim 15, wherein the observer module is configured to alter system functionality when variances in client hardware device performance or server hardware device performance are detected.

19. The computer networking system of claim 15, wherein the server profiler module is configured to alter at least one server attribute in a server profile maintained on the server hardware device, wherein the at least one server attribute comprises server hardware device performance of a server device function over a first period of time.

20. The computer networking system of claim 19, wherein the client profiler module is configured to alter at least one client attribute in a client profile maintained on the client hardware device, wherein the at least one client attribute comprises client hardware device performance of a client hardware device function over a second period of time.

21. The computer networking system of claim 15, wherein the server hardware device is configured to provide an event model that when initiated enters a client hardware device browser, removes an event modal and clones a prototype of the event modal, standardizes and normalizes the prototype, provides custom system events as additions to provide altered functionality, and reinserts that altered functionality into the browser.

* * * * *